United States Patent
Ellingsworth et al.

(10) Patent No.: US 7,285,872 B2
(45) Date of Patent: *Oct. 23, 2007

(54) METHOD AND APPARATUS FOR PREVENTING UNAUTHORIZED USE OF A VEHICLE

(75) Inventors: Carl Ellingsworth, Gatineau (CA); Jay Ripley, Vancouver (CA)

(73) Assignee: 2TIS Technologies Inc., Vancouver, British Columbia (CA)

( * ) Notice: Subject to any disclaimer, the term of this patent is extended or adjusted under 35 U.S.C. 154(b) by 216 days.

This patent is subject to a terminal disclaimer.

(21) Appl. No.: 10/974,848

(22) Filed: Oct. 28, 2004

(65) Prior Publication Data

US 2005/0225174 A1    Oct. 13, 2005

Related U.S. Application Data

(63) Continuation-in-part of application No. 09/832,979, filed on Apr. 12, 2001, now Pat. No. 6,819,009.

(60) Provisional application No. 60/196,301, filed on Apr. 12, 2000.

(51) Int. Cl.
    *B60R 25/00* (2006.01)

(52) U.S. Cl. ..................................... 307/10.3; 180/287

(58) Field of Classification Search ............... 307/10.2, 307/10.3, 10.4, 10.5; 180/287; 340/426.11, 340/426.12, 426.13, 426.16, 426.17
See application file for complete search history.

(56) References Cited

U.S. PATENT DOCUMENTS

| | | | | |
|---|---|---|---|---|
| 3,490,426 A | * | 1/1970 | Farr | 123/149 D |
| 4,653,605 A | * | 3/1987 | Goren et al. | 307/10.3 |
| 5,927,240 A | * | 7/1999 | Maxon | 123/179.3 |
| 6,077,133 A | * | 6/2000 | Kojima et al. | 440/1 |
| 6,819,009 B2 | * | 11/2004 | Ellingsworth | 307/10.3 |
| 2001/0040503 A1 | * | 11/2001 | Bishop | 340/426 |

* cited by examiner

*Primary Examiner*—Michael Sherry
*Assistant Examiner*—Nicholas Ieva
(74) *Attorney, Agent, or Firm*—Ogilvy Renault LLP; Paul Sharpe (57) ABSTRACT

A method to prevent unauthorized use and/or access to a vehicle is disclosed. The method includes apparatus which is positioned within a known motor housing and actuable only within the motor housing. In one embodiment, an ignition generator coil interrupt circuit is provided and mounted directly within the housing of the motor. A switch is connected to the circuit which allows power interruption to the ignition generator coil. When the switch is activated, power interruption of said ignition generator coil is achieved to disable the engine from normal operation. Conveniently, the interrupt circuit is positioned entirely within the housing and therefore inaccessible for tampering. In another embodiment a switch circuit is positioned between an ECM motherboard and sensors typically associate with an automobile engine. This circuit is useful for arrangements which do not include a magneto/stator arrangement.

27 Claims, 8 Drawing Sheets

METHOD AND APPARATUS FOR PREVENTING UNAUTHORIZED USE OF A VEHICLE

CROSS-REFERENCE TO RELATED APPLICATIONS

This application is a continuation-in-part of U.S. patent application Ser. No. 09/832,979, filed Apr. 12, 2001 now U.S. Pat. No. 6,819,009, which claims the benefit of U.S. patent application Ser. No. 60/196,301, filed Apr. 12, 2000.

FIELD OF THE INVENTION

The present invention relates to an apparatus and method for preventing unauthorized use and/or access to a vehicle and more particularly, the present invention relates to a device that provides owners and authorized users varying degrees of control over their vehicle including its theft prevention.

BACKGROUND OF THE INVENTION

Generally speaking, the theft of vehicles such as snowmobiles, ATVs, watercrafts, motorcycles and other vehicles having a magneto/stator present in the motor system, including most non jet propulsion aircraft, is fairly straightforward, much to the demise of the owners of such vehicles. This is also a problem for automobiles despite the fact that they do not include a magneto or stator.

The simplicity in, for example, starting the motors of these vehicles is realized by the arrangements used to link the ignition system to the ignition generator coil. In snowmobiles, for example, the block connectors electrically connect the ignition switch, kill switch and power accessories to the ignition switch. These elements are all exposed outwardly of the motor. To the skilled thief, since these elements are readily accessible, bypass is simple and can typically be achieved in seconds. The result is that the vehicle can be easily started and driven away with ease and with a minimum of effort.

In an attempt to speak to the escalation in theft of these vehicles, many devices have been proposed in the art which attempt to provide the user/owner with a greater degree of security. The arrangements known incorporate alarms, keylock systems, manual circuit interrupts inter alia. These devices, although somewhat useful, are all limited by the same vulnerability, namely the fact that they are external systems which are accessible by a thief and therefore are easily disabled by bypass or "hot wiring".

In the case of snowmobiles, track locks have been proposed. These devices are simply not pragmatic; the user is confined to carrying these bulky awkward items on the snowmobile which requires storage space. This space is often at a premium in view of the size of the snowmobile.

A current manufacturer has offered a digital system (for selected models) and even though its method has a level of effectiveness, it is still vulnerable by its external application. Accordingly, the owner of earlier model vehicles is not helped by the new technology.

Other systems for preventing theft of watercraft include markings on the craft itself or special indications on the hull identification plate. These attempts at preventing theft can be easily circumvented by simply removing and replacing the plates or altering the information thereon.

In terms of automobiles, steering wheel arrangements such as the Club™ are typically employed. These devices are somewhat useful, but are easily removable by determined thieves.

Immobilizers are also used in automobiles for theft prevention, but are limited by their external disposition.

In view of the fact that the vehicles are expensive, a more sophisticated method and apparatus is required which is not external of the motor or engine and which does not employ interceptable digital streams.

The present invention addresses this need and thus one object of one embodiment of the present invention is to provide a control device mounted internally of the engine. This renders control of operation of the vehicle inaccessible to tampering.

SUMMARY OF THE INVENTION

One object of the present invention is to provide an improved apparatus and method for preventing unauthorized use of and ultimately the control of a vehicle.

A further object of the present invention is to provide a method for preventing unauthorized use of a vehicle having a motor, a power source for the motor, a magneto and a stator housed within an engine housing and an ignition generator coil connected in electrical communication with the magneto, the engine housing within an engine compartment, comprising the steps of providing an ignition generator coil interrupt circuit electrically connected to the ignition generator coil, the circuit for selectively interrupting power to the ignition generator, mounting the ignition generator coil interrupt circuit directly within the engine housing, providing switch means mounted within the engine housing and connected to the circuit for allowing power interruption to the ignition generator coil and providing wireless transceiver means connected to the switch means for receiving electromagnetic signals from a signal service provider and transmitting electromagnetic signals to the signal service provider, the switch means being actuable by the transceiver means, and activating the switch means with the wireless transceiver means to alter or interrupt power to the ignition generator coil.

Generally speaking, the vehicles incorporating stator/magneto arrangements include watercraft, all terrain vehicles, and snowmobiles, among others.

As a particular convenience, the switch means may be selected from any suitable switching devices, such as mechanical, electrical, electromechanical, electronic (digital) arrangements. The important feature is that the circuit (supra) is positioned within the housing as opposed to externally; this latter arrangement is what limited the effectiveness of the prior art.

Another object of one embodiment of the present invention is to provide an arrangement for preventing unauthorized use of a vehicle, comprising in combination a vehicle, the vehicle having a power source, a magneto and a stator housed within an engine housing and an ignition generator coil in electrical communication with the magneto, the engine housing mounted within an engine compartment, an ignition generator coil interrupt circuit connected to the ignition generator coil, the circuit for selectively interrupting operation of the ignition generator, the circuit positioned directly within the engine housing, switch means connected to the circuit within the housing for allowing interference in operation of the ignition generator coil for disabling the motor, and wireless transceiver means connected to the switch means for receiving electromagnetic signals from a signal service provider and transmitting electromagnetic signals to the signal service provider, the switch means being actuable by the transceiver means, whereby upon actuation of the wireless transceiver means the switch means is activated.

Mounting location for the circuit is conveniently anywhere within the housing with a suitable connection to the ignition generator coil. As a useful position, the circuit may be positioned between the stator and magneto.

A still further object of one embodiment of the present invention is to provide an arrangement for use with a vehicle having a motor, a power source for the motor, a magneto, a stator, a stator housing and an ignition generator coil in electrical communication with the magneto, the assembly for preventing unauthorized use of a vehicle, comprising a stator plate, mounting means on the stator plate for mounting the ignition generator coil, circuit means mounted within the stator housing for interrupting power to the ignition generator coil, the circuit configured for positioning on the stator plate, switch means connected to the circuit within the housing for allowing interruption of the ignition generator coil for disabling the motor, and wireless transceiver means connected to the switch means for receiving electromagnetic signals from a signal service provider and transmitting electromagnetic signals to the signal service provider, the switch means being actuable by the transceiver means, whereby upon actuation of the wireless transceiver means the switch means is activated.

In the embodiment noted above, the assembly could be provided as a kit for retrofit applications and easily be used for watercraft, snowmobiles, all terrain vehicles, inter alia.

The transceiver arrangement facilitates communication between the vehicle and other extraneous communication devices such as satellite systems, computers, web enabled cellular phones, GPS, personal digital assistants (PDA) or any other suitable device or combination of devices useful for communication.

The transceiver system can be used to control operation of the ignition generator, engine rpm, air/fuel mixture inter alia.

The provision for GPS capacity allows for tracking of the vehicle in the event it is stolen.

As a further object of one embodiment of the present invention, there is provided a method for preventing unauthorized access to a vehicle having an engine and block therefor, sensors for effecting engine activation, a power source, ignition coils, and means for establishing electrical communication between the sensor and the coils, the method comprising the steps of providing switch means for interrupting power delivery to the sensors, positioning the switch means between at least one sensor of the sensors and the means for establishing electrical communication between the sensors and the coils, mounting the switch means to the at least one sensor, and activating the switch means to interrupt power delivery to the sensors.

A still further of object of one embodiment of the present invention is to provide a method for controlling vehicle function, operation and unauthorized use of the vehicle having an engine and block therefor, sensors for effecting engine activation and other functions, a power source, ignition coils, and means for establishing communication between the sensor and the coils, the method comprising the steps of providing switch means for and augmenting communication to and/or from the sensors for altering function of the sensors, providing wireless transceiver means connected to the switch means for receiving electromagnetic signals from a signal service provider and transmitting electromagnetic signals to the signal service provider, the switch means being actuable by the transceiver means, positioning the switch means and the transceiver means between at least one sensor of the sensors and the means for establishing communication between the sensors and the coils, mounting the switch means and the transceiver means to the at least one sensor, and activating the switch means by the transceiver means for communicating with the sensors for altering engine activation and other functions.

The means for establishing electrical communication between the sensors and coils is known in the art as an ECM motherboard. In current arrangements the ECM motherboard in automobiles is externally mounted of the engine and thus is vulnerable to tampering. If removed and replaced with a similar component not equipped with a theft deterrent (immobilizer) auto theft is easily achieved.

By providing the switch arrangement and mounting location, the presence of an immobilized ECM motherboard is of no consequence; the arrangement discussed supra interrupts power to the sensors leading to the ECM motherboard and further is mounted at least partially within the engine block to avoid tampering, bypass or expeditious removal. The ECM may also be mounted internally.

As a particularly attractive advantage, the switch means may be integrally mounted to the sensor or a plurality of sensors. By providing several such switches, security for preventing unauthorized access may be augmented.

It will be readily apparent to those skilled that the vehicles having stator/magneto arrangements could easily be adopted to the circuit mentioned above where the stator/magneto is removed in future modifications of such vehicles.

Having thus described the invention, reference will now be made to the accompanying drawings illustrating preferred embodiments.

BRIEF DESCRIPTION OF THE DRAWINGS

Similar numerals in the figures denote similar elements.

DETAILED DESCRIPTION OF THE
PREFERRED EMBODIMENTS

Figure 1:
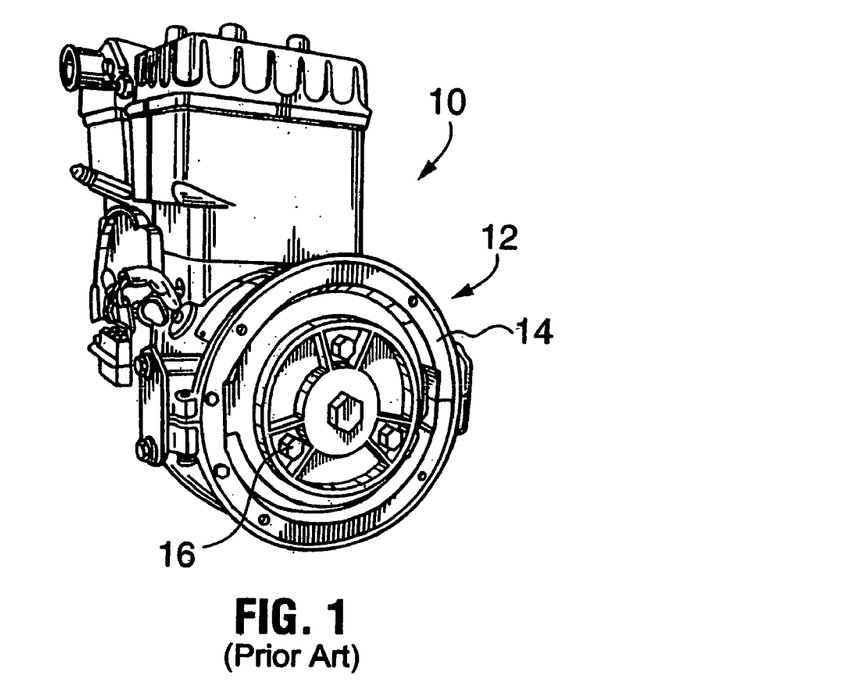
FIG. 1 is a perspective view of a typical engine of the vehicles set forth herein.

Referring now to the drawings and particularly FIG. 1, numeral 10 generally references the engine. There is provided a housing 12 for housing the magneto and stator. A cover 14 is fixed by fasteners 16 to provide a sealed stator/magneto housing. As is generally known, specialized tools and skill are required to remove the cover 14 and eventually gain access to the interior of the housing 12.

Figure 2:
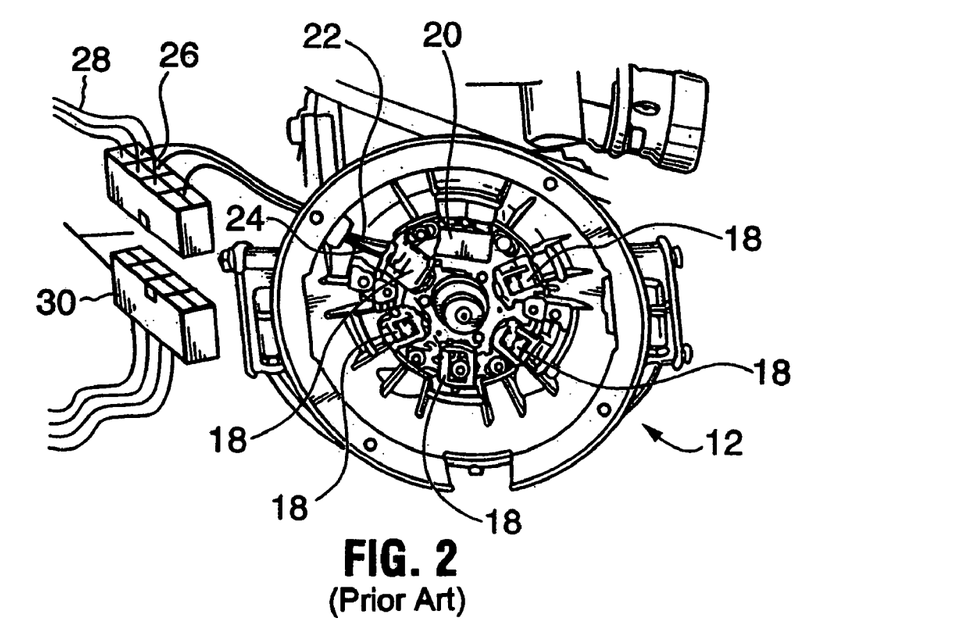
FIG. 2 is a view similar to FIG. 1 with the cover removed from the stator housing.

FIG. 2 illustrates the interior of the housing 12 where there are mounted several coils 18, shown in the example as a quantity of five. A main coil or ignition generator coil 20 is also provided and is integral in starting the engine. It is known that such coils generally operate on the principle of sensors. Coil 20 has two leads 22 and 24 which terminate at a block connector 26. Block connector 26 also includes leads, generally referenced by numeral 28, leading to the CDI box (not shown). A mating block connector 30 connects to block connector 26 and the former provides leads to the ignition switch, kill switch and power accessories (none of which is shown) of the vehicle (not shown).

The arrangement is generally well known in the art. Unfortunately, it is also well known that by simply disconnecting the block connectors 26 and 30, all security systems typically associated with the vehicle are disabled while a signal is still capable of being supplied to the CDI box from the ignition generator coil 20. Accordingly, the vehicle will start in this condition.

Figure 3:
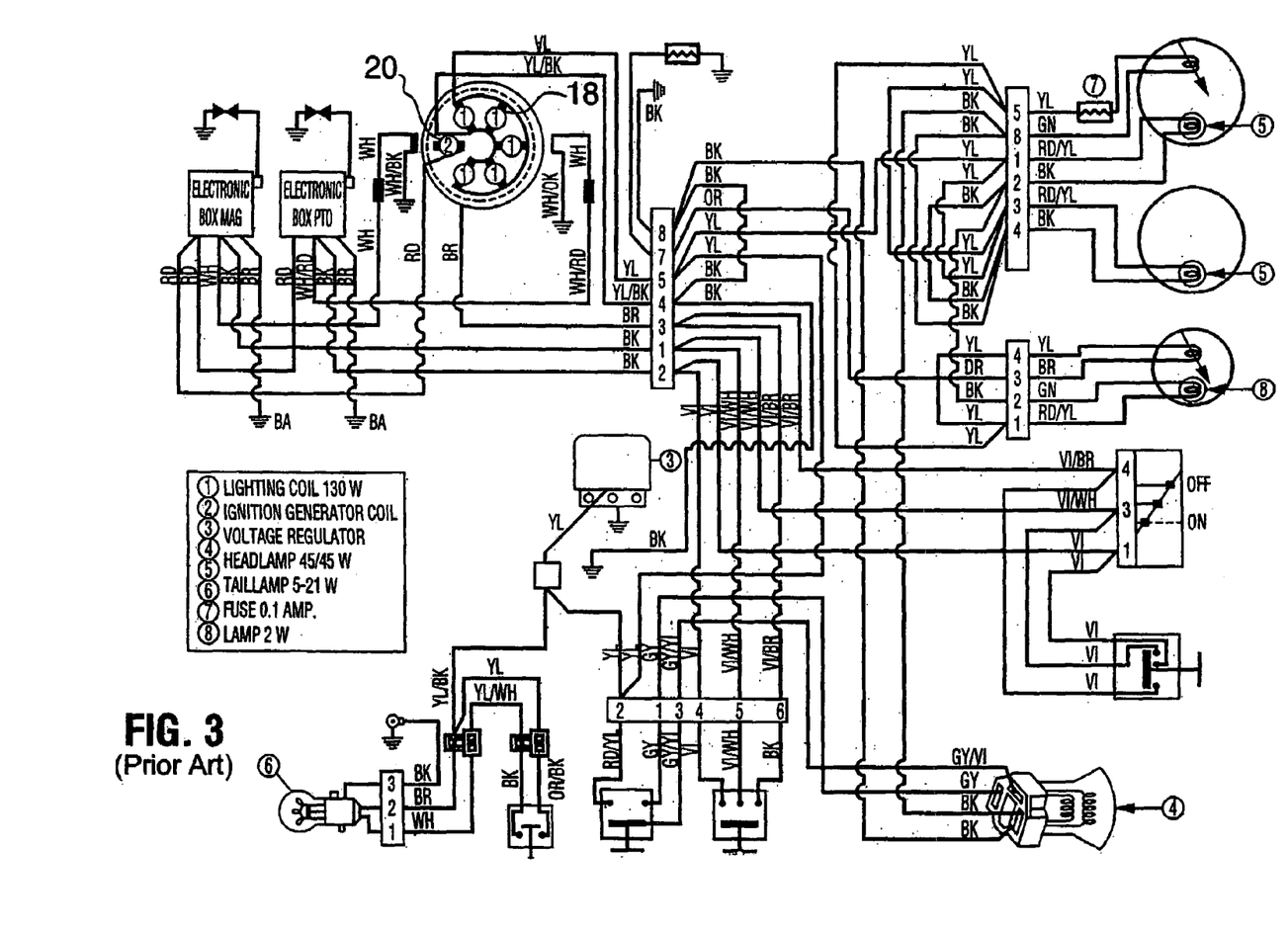
FIG. 3 is a schematic diagram of the wiring of a typical snowmobile.

FIG. 3 illustrates a typical schematic diagram for a conventional snowmobile, although the diagram is applicable to typical magneto/stator motors. As the diagram illustrates, the disposition of the ignition generator coil 20 in the circuit facilitates easy starting of the engine when the block connectors 26 and 30 are disconnected.

Figure 4:
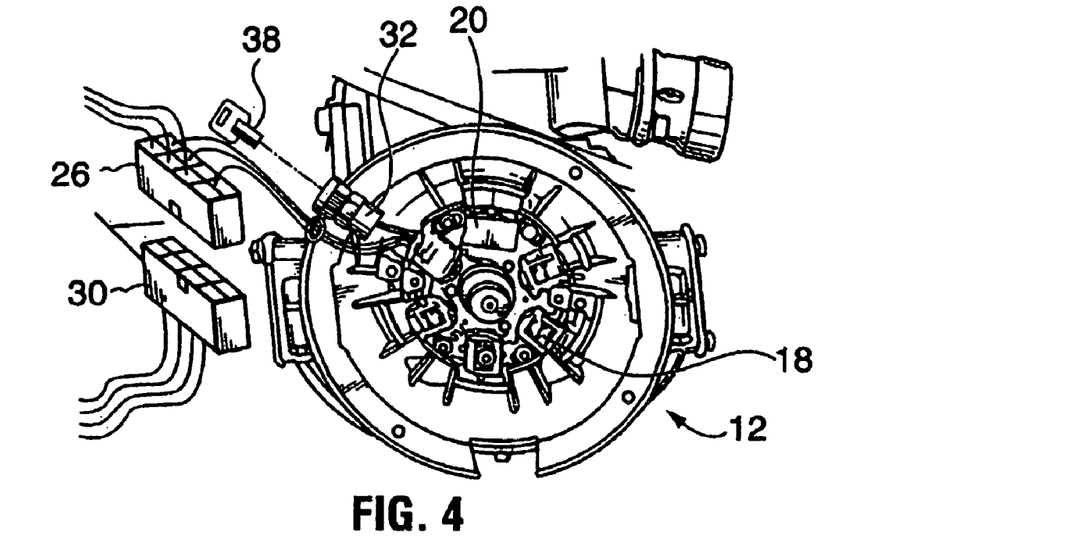
FIG. 4 is a view similar to FIG. 2 with the arrangement according to one embodiment installed.
Figure 5:
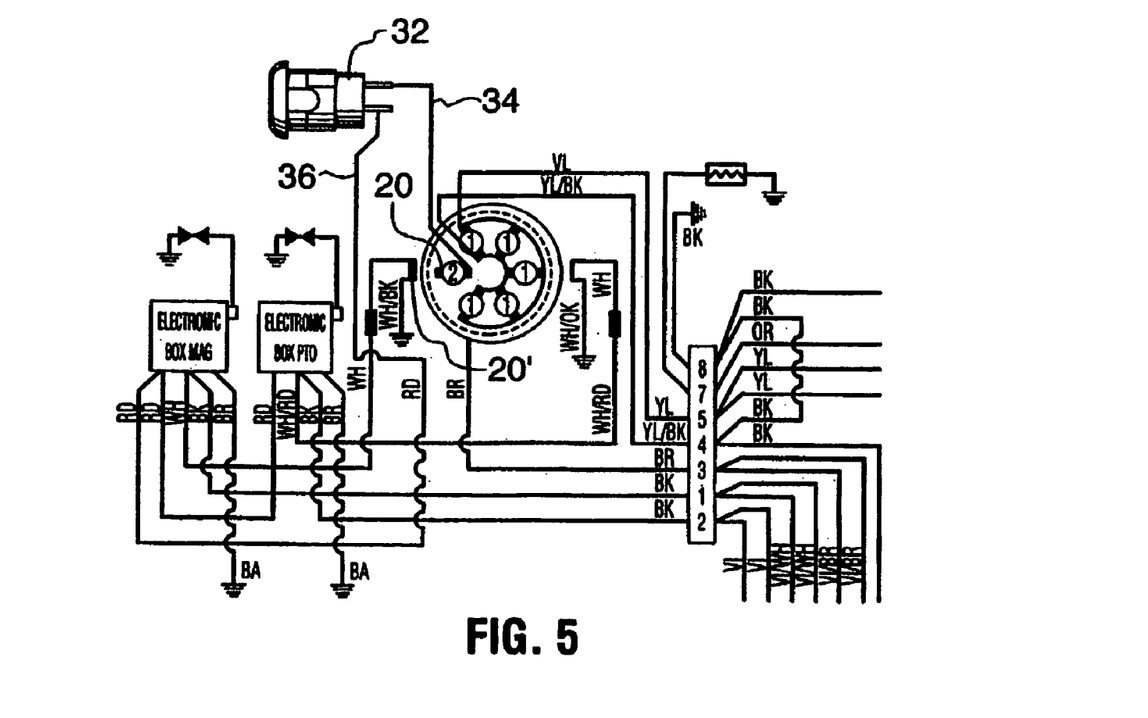
FIG. 5 is an abbreviated schematic diagram illustrating the positioning of the elements according to one embodiment of the present invention.

FIG. 4 illustrates an example of the invention as positioned within the housing 12. A switch 32 is disposed in housing 12 and in this case is an electrical/mechanical switch. FIG. 5 illustrates a truncated schematic of the circuit of FIG. 4 showing the positioning of the switch 32 and its relationship to ignition generator coil 20. As illustrated, the switch 32 includes leads 34 and 36, with lead 34 being connected to ignition generator coil 20 and lead 36 extending to other electrical connections related to starting the vehicle. By connection to ignition generator coil 20, the circuit is interrupted in the OFF position and is unaffected by disconnection of block connectors 26 and 30. Accordingly, the user, in order to start the vehicle must initially actuate the switch 32 into the ON position with, for example, a key 38 which, in turn, will re-enable the ignition generator coil 20. Once this is done, normal procedures may be performed to start the vehicle.

In the embodiment of FIG. 5, a switch is mounted in the housing 12 adjacent the ignition generator coil 20. Trigger coils are reverenced by numeral 20'. This is not essential. In the situation where the switch system comprises a remotely controllable arrangement, the switch may be replaced by a receiver (not shown) well known in the art. In these devices an antenna can be positioned in any convenient location provided it can communicate with a transmitter (not shown). It will be appreciated to those skilled in the art that any suitable switch capable of selectively interrupting the ignition generator coil circuit may be used.

Advantageously, by positioning the circuit interrupt portion of the switch within the housing, tampering or bypass is difficult, tedious and would more than likely damage the vehicle if a thief attempted any tampering. Further, if the switch mechanism is damaged, broken or removed, the vehicle cannot be made to start unless original wiring is restored. Cover 14 is removed and the switch 32 removed from the vehicle. This is obviously time consuming and cannot be performed with any degree of stealth.

Figure 6:
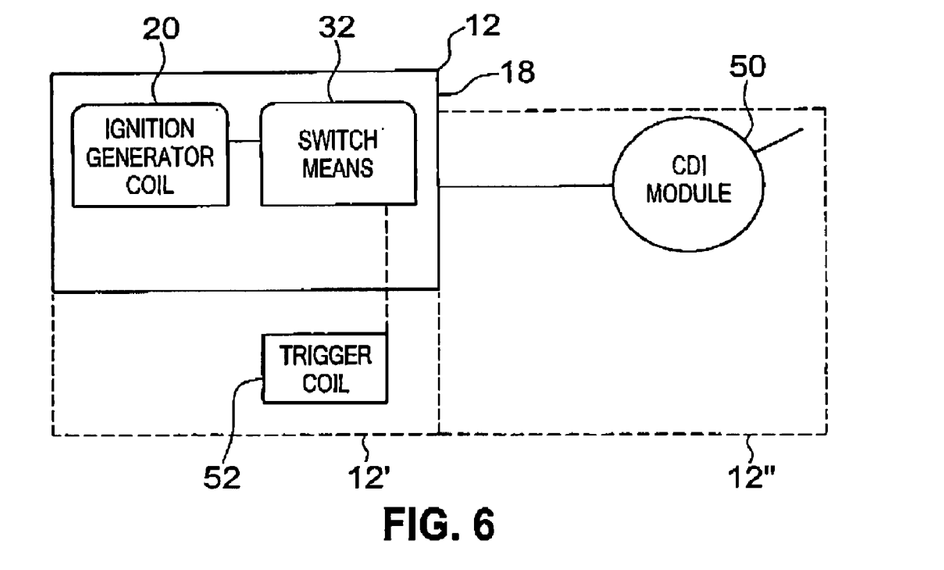
FIG. 6 is a schematic diagram of the starting circuit for an automobile with the switch.

FIG. 6 illustrates a further embodiment of the overall concept of the invention. In this embodiment, the engine housing 12 is shown the ignition generator coil 20 connected to the switch means 32 and the circuit positioned within housing 12. As illustrated, this circuit is electrically connected to a CDI box, referenced in this figure by number 18. The CDI module 18 is, in turn, electrically connected to the additional coils as well as a power supply (not shown) as is well known. As a further variation of FIG. 6, the dashed line represented by numeral 12' constitutes the engine housing 12, but accommodates a trigger coil 52, which trigger coil 52 communicates electrically with switch means 32 and subsequently to CDI module 18. This is a variation where the trigger coil 52, switch means 32 and CDI module 18 are electrically connected for interruption. This provides an alternative to the ignition generator coil 20, switch means 32 and CDI module 18 combination.

As still a further variant, the engine housing represented by the extended chain line 12" may also include the CDI module 50 such that the CDI module 50, switch 32 and ignition generator coil 20 as well as trigger coil 52 are all positioned within the engine housing.

Figure 7:
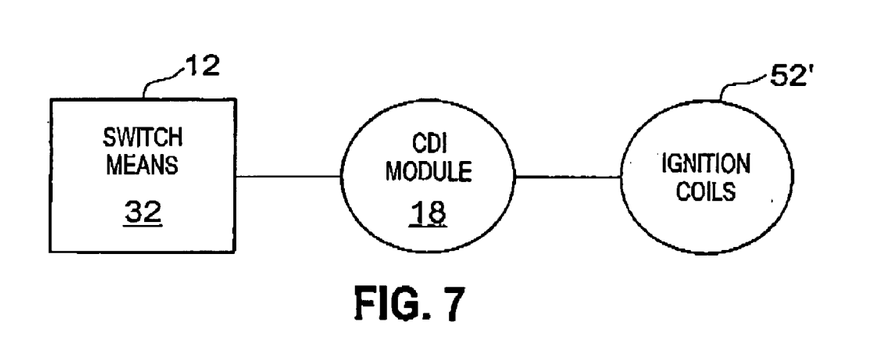
FIG. 7 is a schematic illustration of a vehicle and positioning of various sensors.

FIG. 7 illustrates a further variation where the electrical communication between switch means 32 and ignition coils, referenced as 52', is interrupted by CDI 18.

The point in the further variations is to demonstrate the fact that the switch 32 is positioned within the housing and is in one manner or another connected to an essential element required for operation of the engine (not shown). By this provision, theft of the vehicle incorporating the variants outlined in FIG. 6 is substantially averted, since no parts are available outside of the engine compartment for easy removal and or exchange in order to steal the vehicle.

Figure 9:
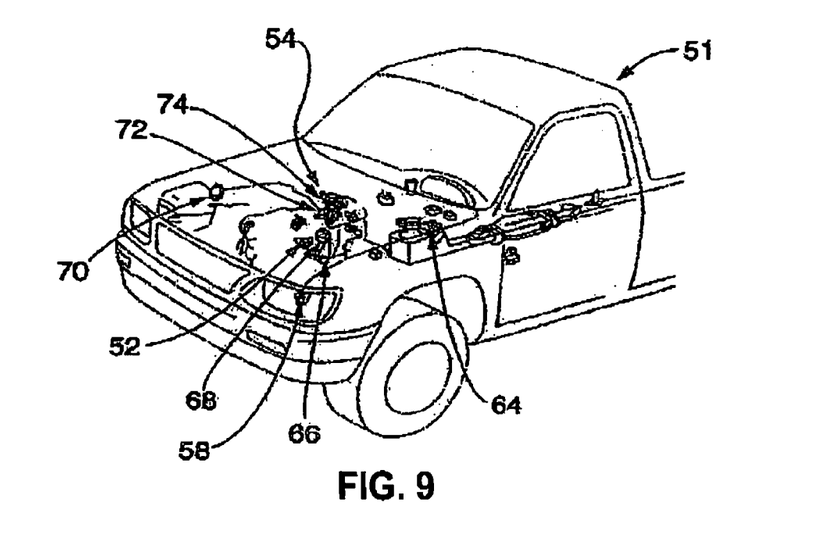
FIG. 9 is a schematic illustration of a vehicle and positioning of sensors.

In FIG. 9, a vehicle 51 is shown and includes an engine and an engine block, broadly denoted by numeral 54. As is known, a number of sensors are required to carry out various functions with respect to the operation of the vehicle. In the example, numeral 56 represents a camshaft position sensor, numeral 58 represents a crankshaft position sensor and numerals 56 through 74 represent other sensors, amplifiers, inter alia.

Figure 8:
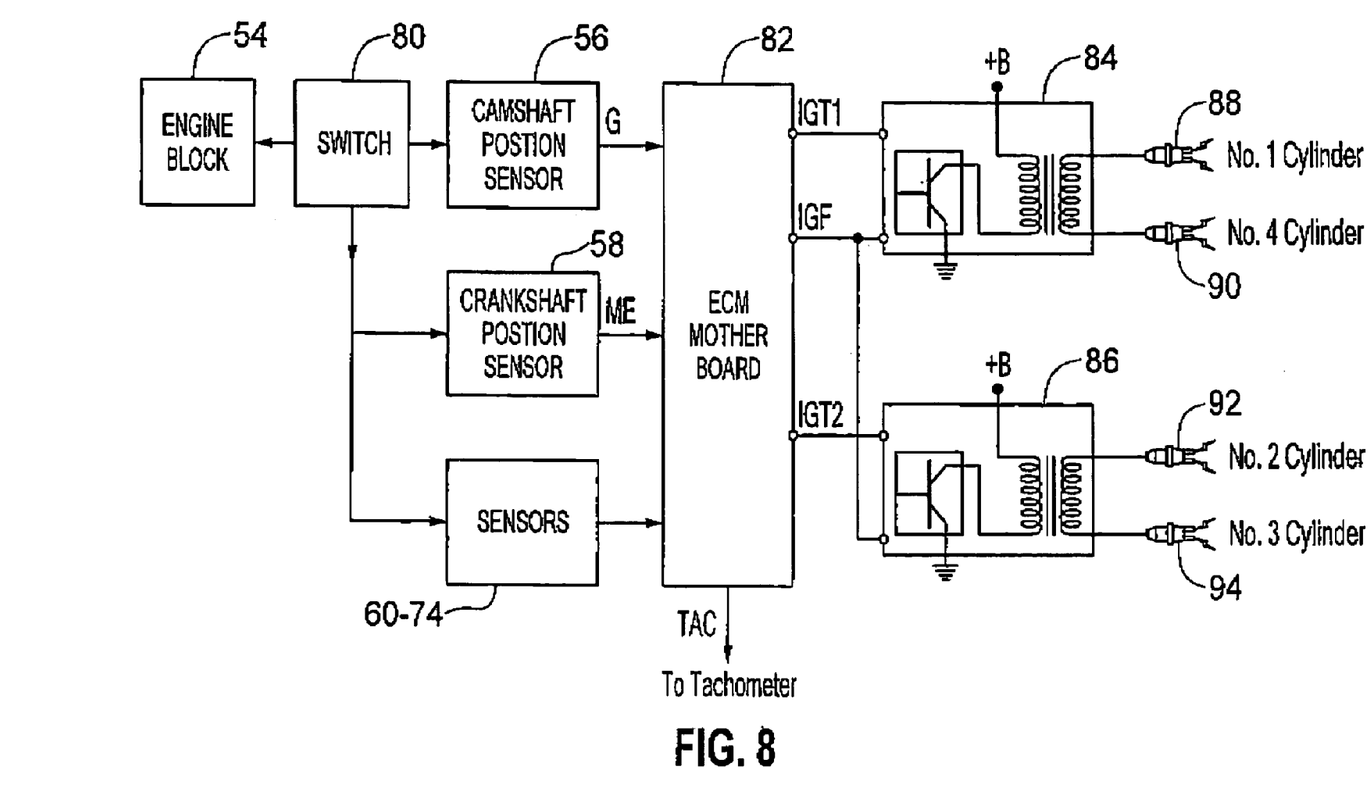
FIG. 8 is a schematic diagram of the switch arrangement in relation to the sensor(s) and ECM motherboard.

As is illustrated in FIG. 8, disposed between engine 54 and sensors 56 through 74 is a switch 80. The sensors 56 through 74 are in electrical communication with an ECM motherboard 82 which is responsible for numerous functions, the most important of which for purposes of this discussion is communication between the sensors and ignition coils 84 and 86. As is known, coils 84 and 86 each communicate with cylinders 88, 90, 92, and 94, respectively.

By providing power interruption via switch 80 to the sensors 56 through 74, it is inconsequential as to whether the ECM motherboard 82 is equipped with anti-theft provisions such as an immobilizer (not shown). This is a significant advantage since the sensors are effected by the switch 80 as opposed to the ECM motherboard 82. By effecting the sensors 56 through 74, the ECM motherboard 82 is also effected. This is a more effective system since it does not matter whether the ECM motherboard includes anti-theft provisions.

The sensors, and particularly those shown in FIG. 8, i.e. sensors 56 and 58 are typically at least partially mounted within the engine block 54 as is generally depicted in FIG. 9. By connecting the switch 80 to all or some of the sensors 56 through 74, the switch is therefore at least partially mounted in the engine block 54 and therefore presents significant difficulty for potential thieves to tamper with the arrangement. This is in marked contrast to the disposition of the ECM motherboard 82 which is easily accessible.

Figure 10:
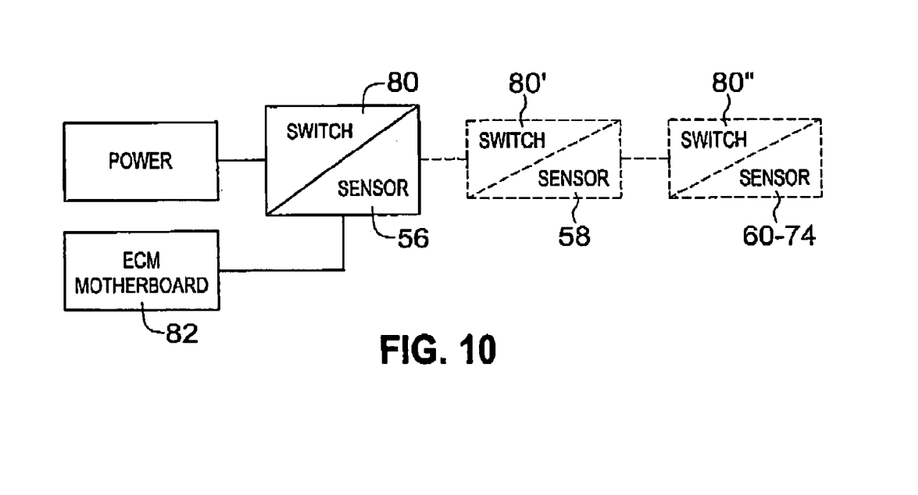
FIG. 10 is a schematic diagram of the switch arrangement in relation to the sensors and ECM motherboard.

In this manner, the sensors 52 through 70 and the switch 80 (of which there may be several) can be integrated as a single unit. This arrangement is shown in FIG. 10 where the switch 80 and sensor 56 are unified as a single unit. FIG. 10 also shows in dashed line the possibility of augmenting security by linking various switches and sensors in tandem.

Figure 11:
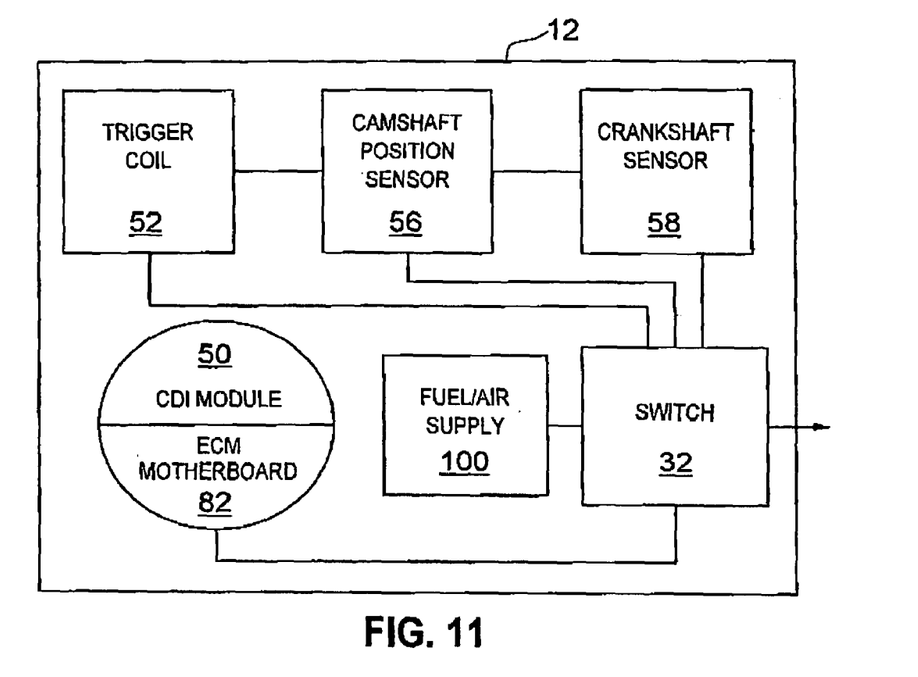
FIG. 11 is a schematic illustration of another embodiment.

Referring now to FIG. 11, shown is a generic illustration which is applicable to either stator magneto arrangements or conventional internal combustion engines. Once again, it is illustrated the switch 32 is positioned within the housing 12 and that any one of the essential elements for engine operation such as the trigger coil 52 camshaft position sensor 56, crankshaft sensor 58, CDI module 50, ECM motherboard 82 and/or fuel/air supply 100 may be connected to the switch internally of housing 12 in order to provide the highest degree of security and therefore the lowest incidents of theft.

Figure 12:
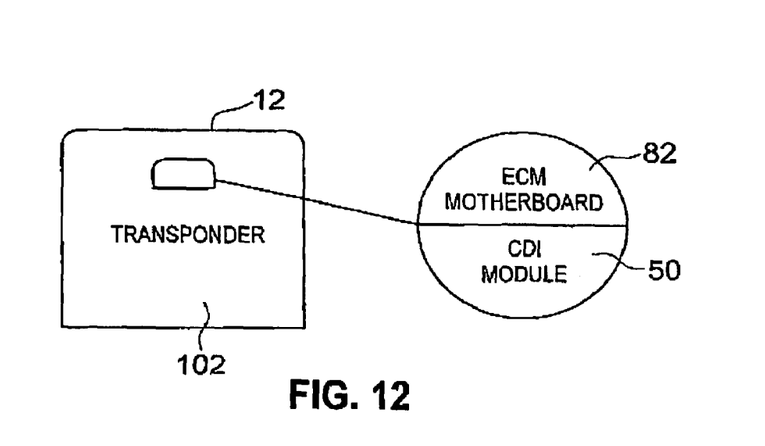
FIG. 12 is a schematic illustration of another embodiment.

FIG. 12 illustrates a further variation of the arrangement when a transponder 102 is positioned within housing 12 and communicates with ECM motherboard 82 and CDI module 50.

Figure 13:
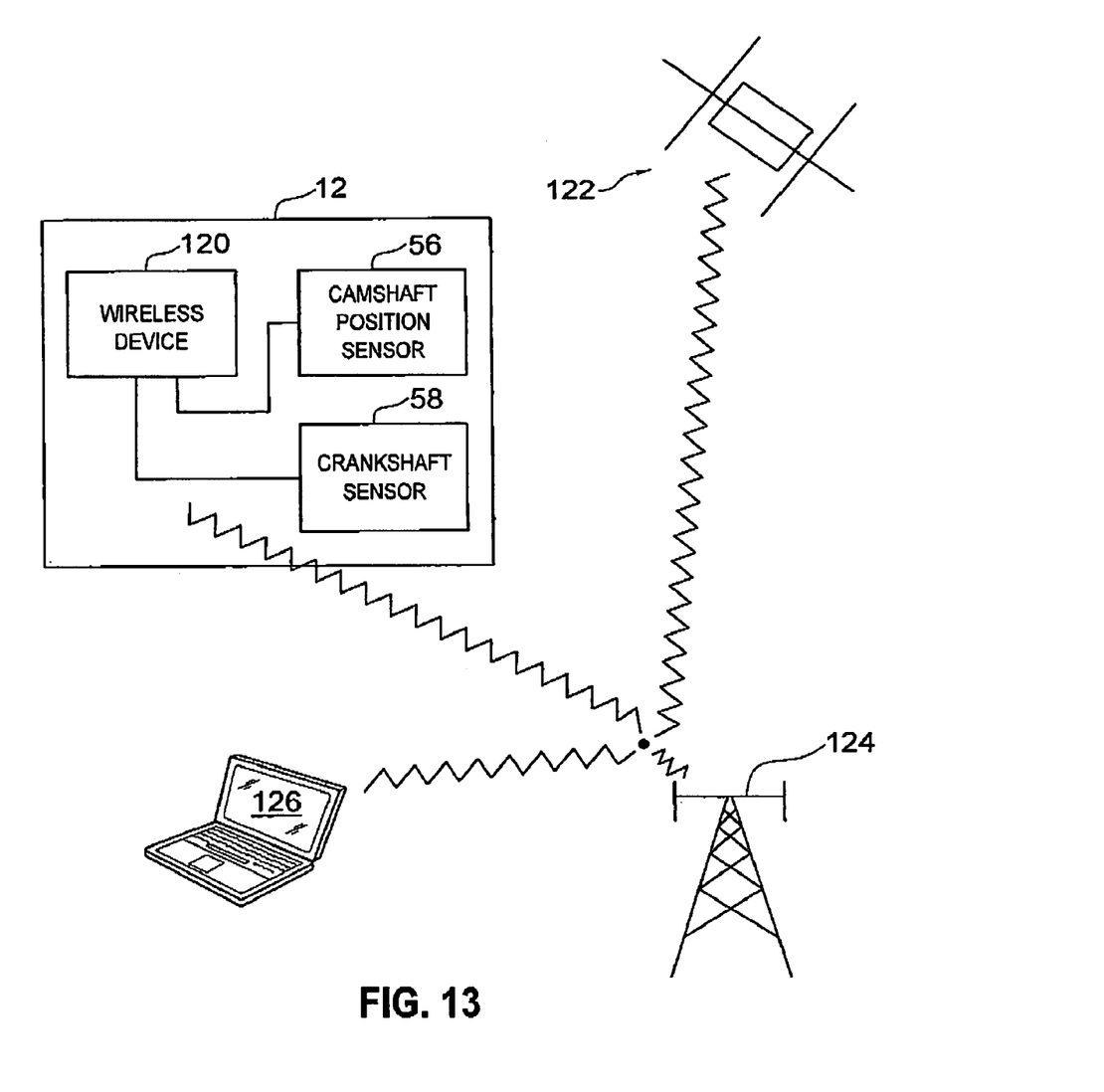
FIG. 13 is a schematic illustration of another embodiment.

FIG. 13 illustrates yet another embodiment of the present invention in which a wireless transceiver is connected to the switch means for interrupting various operations of the vehicle. The interruption circuit has been discussed herein previously; however, in this embodiment the interrupt circuit includes a wireless communication means, such as a wireless transceiver or transponder. The overall union of these two elements is broadly denoted in FIG. 13 and represented by numeral 120. As referenced with respect to FIG. 9, the sensors 56 and 58 are in direct electrical communication with the interrupt circuit modified with the wireless transceiver.

By this arrangement, wireless communication is effected with the vehicle and in view of the fact that the interrupt circuit includes a wireless arrangement with sensors at least partially mounted within the engine housing 12, all of the advantages realized with respect to the difficulty in removal of the arrangement are immediately realized. This is not the case with existing wireless arrangements, such as, for example, the On Star™ system. The On Star™ system is very useful, however, it can be tampered with and even removed entirely from the engine compartment in view of the fact that the arrangement is not at least partially mounted within the engine housing. By incorporating the desirable features of the circuit discussed herein previously and augmenting the system with a wireless transceiver, all of the limitations of externally mounted wireless systems are overcome. As will be appreciated, this is particularly useful for tracking a stolen vehicle or, in extreme situations where the vehicle has been "chopped" the engine can be located by the wireless transponder.

In order to facilitate communication with the vehicle, the conventional system for wireless communications may be employed. This includes the satellites, one of which is shown in FIG. 13 denoted by numeral 122 which can communicate with a land based tower 124 for receiving and transmitting signals to the wireless arrangement 120 in engine housing 12 as well as a portable communication device 126, shown in the example as a laptop computer. It will be appreciated that other communication devices such as a web enabled cell phone, personal digital assistant or any other portable or permanent wireless communication device. This allows communication from land based systems such as the On Star™ with the tower and/or the individual circuit in the engine housing 12. This is useful to control engine functions such as specific engine operations, and is useful to perform diagnostics on the engine and convey this information to a user of the vehicle by way of a stereo system within the vehicle (both of which are not shown) or by other means such as a user's cellular phone (not shown).

It will also be appreciated that all of the functions that are presently available by wireless communication can be realized with the instant invention such as vehicle tracking, performance and other factors. It will be evident that any of the existing wireless networks can be employed with the system with the simple modification of a specifically tuned transponder/transceiver.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method for preventing unauthorized use of a vehicle having a motor, a power source for said motor, a magneto and a stator housed within an engine housing and an ignition generator coil connected in electrical communication with said magneto, said engine housing within an engine compartment, comprising the steps of:

providing an ignition generator coil interrupt circuit electrically connected to said ignition generator coil, said circuit for selectively interrupting power to said ignition generator, mounting said ignition generator coil interrupt circuit directly within said engine housing;

providing switch means mounted within said engine housing and connected to said circuit for allowing power interruption to said ignition generator coil;

providing wireless transceiver means connected to said switch means for receiving electromagnetic signals from a signal service provider and transmitting electromagnetic signals to said signal service provider, said switch means being actuable by said transceiver means; and activating said switch means with said wireless transceiver means to alter or interrupt power to said ignition generator coil.

2. The method as set faith in claim 1, wherein said ignition generator coil interrupt circuit is mounted adjacent said ignition generator coil.

3. The method as set faith in claim 1, including the step of providing an opening in said housing for providing access for said switch means to said ignition generator coil interrupt circuit.

4. An arrangement for preventing unauthorized use of a vehicle, comprising in combination:

a vehicle, said vehicle having a power source, a magneto and a stator housed within an engine housing and an ignition generator call in electrical communication with said magneto, said engine housing mounted within an engine compartment;

an ignition generator coil interrupt circuit connected to said ignition generator coil, said circuit for selectively interrupting operation of said ignition generator, said circuit positioned directly within said engine housing;

switch means connected to said circuit within said housing for allowing interference in operation of said ignition generator coil for disabling said motor; and wireless transceiver means connected to said switch means for receiving electromagnetic signals from a signal service provider and transmitting electromagnetic signals to said signal service provider, said switch means being actable by said transceiver means, whereby upon actuation of said wireless transceiver means said switch means is activated.

5. The arrangement as set forth in claim 4, wherein said wireless transceiver means is mounted within said engine housing.

6. The arrangement as set forth in claim 5, wherein said ignition generator coil interrupt circuit is positioned within said housing between said stator and said magneto.

7. The arrangement as set forth in claim 5, wherein said circuit is positioned adjacent said ignition generator coil.

8. The arrangement as set forth in claim 5, wherein said circuit is positioned between said ignition generator coil and circuitry for starting said motor.

9. The arrangement as set forth in claim 5, wherein said stator includes a stator plate.

10. The arrangement as set forth in claim 9, wherein said circuit is mounted on said stator plate.

11. The arrangement as set forth in claim 5, wherein said switch means comprises remote control switch means.

12. The arrangement as set forth in claim 11, wherein said remote control switch means includes a transmitter and a receiver, said transmitter and receiver being mounted to said circuit.

13. The arrangement as set forth in claim 5, wherein said switch means includes a digitally encoded key and a circuit to communicate with said key.

14. The arrangement as set forth in claim 5, wherein said switch means comprises a combined electrical/mechanical keylock switch mounted to said housing in communication with said circuit.

15. The arrangement as set forth in claim 5, wherein said vehicle is selected from the group consisting of an all terrain vehicle, a motorcycle, a snowmobile, an aircraft and a watercraft.

16. An arrangement for use with a vehicle having a motor, a power source for said motor, a magneto, a stator, a stator housing and an ignition generator coil in electrical communication with said magneto, said assembly for preventing unauthorized use of a vehicle, comprising:
a stator plate;
mounting means on said stator plate for mounting said ignition generator coil;
circuit means mounted within said stator housing for interrupting power to said ignition generator coil, said circuit configured for positioning on said stator plate;
switch means connected to said circuit within said housing for allowing interruption of said ignition generator coil for disabling said motor; and
wireless transceiver means connected to said switch means for receiving electromagnetic signals from a signal service provider and transmitting electromagnetic signals to said signal service provider, said switch means being actuable by said transceiver means, whereby upon actuation of said wireless transceiver means said switch means is activated.

17. The arrangement as set forth in claim 16, wherein said wireless transceiver means is mounted within said housing.

18. The arrangement as set forth in claim 17, wherein said circuit means is positioned on said stator plate between said plate and said ignition generator coil.

19. The arrangement as set forth in claim 17, wherein said vehicle is selected from the group consisting of snowmobiles, watercraft, all terrain vehicles, motorcycles and aircraft.

20. A method for controlling unauthorized use of a vehicle having a motor, a power source for said motor, an engine housing, means for enabling starting of said vehicle, said engine housing within an engine compartment, comprising the steps of:
providing an interrupt circuit electronically connected to said means for enabling starting of said vehicle, said circuit for selectively interrupting power to said means for enabling starting of said vehicle;
mounting said interrupt circuit directly within said engine housing;
providing switch means mounted within said engine housing end connected to said circuit for allowing power interruption to said means for enabling starting of said vehicle;
providing wireless transceiver means connected to said switch means for receiving electromagnetic signals from a signal service provider and transmitting electromagnetic signals to said signal service provider, said switch means being actuable by said transceiver means; and
activating said switch means with said wireless transceiver means to alter or interrupt power to said means for enabling starting of said vehicle.

21. The method as set forth in claim 20, further including mounting said wireless transceiver means within said engine housing.

22. The method as set forth in claim 20, wherein said switch means comprises remote control switch means.

23. The method as set forth in claim 22, wherein said remote control switch means includes a transmitter and a receiver, said transmitter and receiver being mounted to said circuit.

24. The method as set forth in claim 20, wherein said motor comprises an internal combustion engine.

25. The method as set forth in claim 1, wherein at least a portion of said interrupt circuit is mounted directly within said engine housing.

26. The method as set forth in claim 20, wherein at least a portion of said interrupt circuit is mounted directly within said engine housing.

27. The method as set forth in claim 20, wherein said transceiver means is selected from the group consisting of a satellite communication device, a cellular phone unit and a radio frequency transceiver.

* * * * *